Feb. 17, 1959 J. R. ANDERSON 2,874,214

MAGNETIC RECORDING SYSTEM FOR STORING AND REPRODUCING TELEVISION SIGNALS

Filed June 9, 1953 2 Sheets-Sheet 1

INVENTOR
J. R. ANDERSON
BY
V. P. Priolo
ATTORNEY

Feb. 17, 1959 J. R. ANDERSON 2,874,214

MAGNETIC RECORDING SYSTEM FOR STORING AND REPRODUCING TELEVISION SIGNALS

Filed June 9, 1953 2 Sheets-Sheet 2

INVENTOR
J. R. ANDERSON
BY V. P. Priolo
ATTORNEY

United States Patent Office 2,874,214

Patented Feb. 17, 1959

2,874,214

MAGNETIC RECORDING SYSTEM FOR STORING AND REPRODUCING TELEVISION SIGNALS

John R. Anderson, Berkeley Heights, N. J., assignor to Bell Telephone Laboratories, Incorporated, New York, N. Y., a corporation of New York Application June 9, 1953, Serial No. 360,539

2 Claims. (Cl. 178—6.6)

This invention relates to data storage systems and, more particularly, to systems capable of magnetically storing signals comprising a wide range of frequencies.

It is an object of this invention to provide a wide range magnetic recording and reproducing system capable of storing television signals.

In accordance with the present invention a television signal may be magnetically recorded by electromagnetic transducer heads having a frequency response of 4 megacycles, on a record medium having a lineal speed of such magnitude as is required for recording frequencies of the order of 4 megacycles, and comprising a plurality of record tracks, the length of recording time for each of which is controlled by the horizontal synchronizing pulses contained in the video signal.

The nature of the invention and its distinguishing features and advantages will be more clearly understood from the following detailed description and the accompanying drawings in which.

Figure 1:
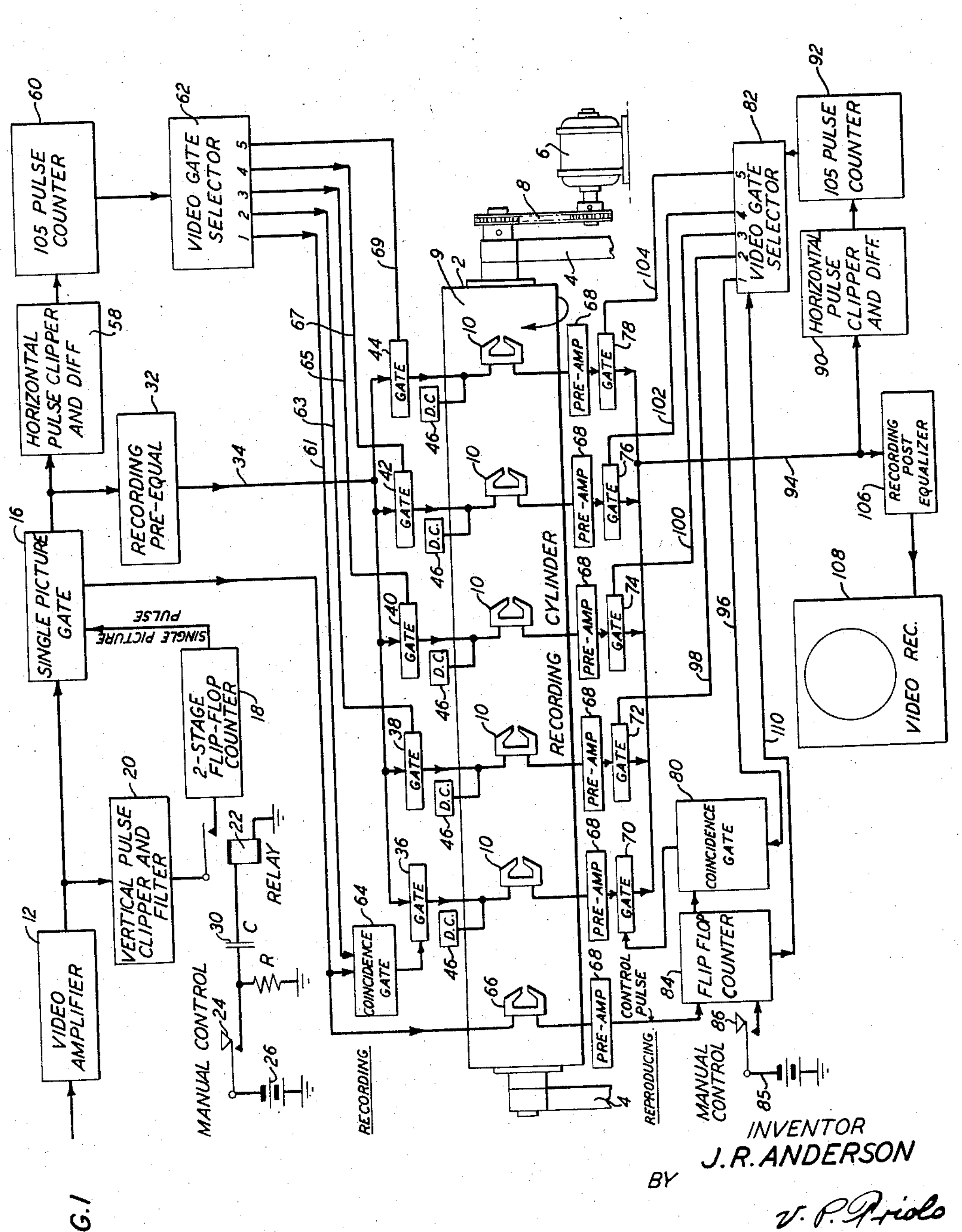
Fig. 1 is a diagrammatic representation of a preferred embodiment of the present invention.

Referring now to the accompanying drawings, 2 is a rotary drum suitably mounted in bearings 4 and driven by motor 6 through belt 8. In the preferred embodiment of the invention shown in Fig. 1 the drum 2 is formed of a non-magnetic material, has a diameter of 11.67 inches and rotates at 8500 revolutions per minute. The record medium 9 consists of a 0.0003 inch cobalt-nickel plating on the drum periphery.

The recording-reproducing heads 10 are made up of high permeability laminations 0.001 inch thick, and coils whose fundamental frequency response is 7 to 8 megacycles. These heads, which may be of the type described in Patent 2,592,652 granted to F. G. Buhrendorf on April 15, 1952, have gaps which are approximately 0.0005 inch wide, and are spaced about 0.0008 inch from the record medium.

As is well known, it is necessary to use a bias current in recording magnetically to preserve the linearity of the recorded signal. The best linearity is obtained by recording with an alternating-current bias several times the frequency of the highest signal frequency to be recorded. In the high frequency system shown in Fig. 1, this would place the bias frequency in the 15 to 20-megacycle region. In view of this it has been found to be more practical to employ a direct-current bias and record on a saturated medium at some sacrifice in signal-to-noise ratio and increase in distortion.

The diameter and speed of rotation of drum 2 provide a lineal speed of approximately 5200 inches per second for the record medium which speed is suitable for recording and reproducing frequencies from 30 cycles per second to 4 megacycles. The recording time for one peripheral track is 0.00706 second. The full one-thirtieth of a second required for one television picture frame may therefore be obtained by employing five recording-reproducing heads and recording the signal consecutively around peripheral tracks side by side.

The television signal to be recorded is amplified to recording level by the amplifier 12. The signal next passes through the gate or electronic switch 16 which allows only one picture frame to pass through to the recording heads. Gate 16, which is normally closed, must be opened and held open for only the length of one picture, or one-thirtieth of a second. Gate 16 may be of the germanium diode or of the vacuum tube type and is opened by the application of voltage to a control element. Gates of this type, which are capable of passing all frequencies from 1 to more than 4,000,000 cycles per second are described in Massachusetts Institute of Technology Radiation Laboratory Series, volume 19, page 374, and in United States Patent 2,535,303. The voltage required to hold gate 16 open is provided by a suitable two-stage bistable multivibrator 18 which is triggered by the vertical synchronizing pulses in the video signal.

Figure 3:
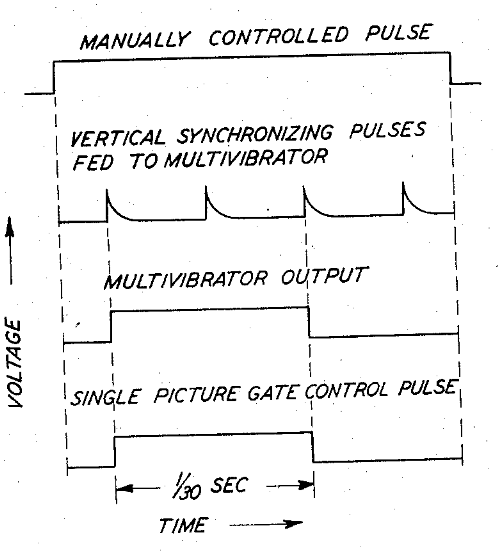
Fig. 3 illustrates the utilization of the vertical synchronizing pulses to provide a pulse which corresponds to the length of a single video picture frame.

A complete video picture is contained between number one and number three of any three consecutive vertical synchronizing pulses. These vertical pulses are obtained by passing the video signal through the clipping and filtering device 20. The vertical pulses are obtained by clipping the video signal and feeding the resultant signal through a low-pass filter which will allow only the vertical synchronizing pulses to pass. The required number of vertical synchronizing pulses are passed from the clipping and filtering device 20 to the multivibrator 18 by means of the relay 22 which closes the path between the clipping device 20 and multivibrator 18 for the time interval required to pass (as illustrated in Fig. 3) not less than two picture frames (greater than one-fifteenth of a second or 4 vertical pulses), but less than two and one-half picture frames (less than 5 vertical pulses). At least four vertical pulses (Fig. 3) will always be fed to the multivibrator 18, the output of which will always be high for two pulse periods and low for two pulse periods, providing a positive output voltage or pulse corresponding to the length of a single picture. The relay 22, which in the preferred embodiment of this invention is of the mercury type, is operated by means of the control key 24, which may be manually operated, the direct-current source 26 and an RC circuit comprising the condenser 30 connected in series with the winding of relay 22. Current will flow from the source 26 through the condenser 30 and the coil of relay 22 only while condenser 30 is being charged up, and the closure time of relay 22 and the path between the clipping device 20 and the multivibrator 18 is determined by this charging cycle.

With gate 16 opened by the single picture pulse provided by the multivibrator 18, the single is passed through the preequalizer 32, a conventional R, L, C passive network designed to compensate for the difference between a flat frequency response and the frequency response of the magnetic recording system, to a common bus 34. The bus 34 is connected to the recording-reproducing heads 10 through the electronic gates 36 to 44 which are similar to gate 16 and are normally closed. The direct-current source 46 provides a direct-current recording bias during the length (one-one hundred and fiftieth of a second) of the incoming signal fed to each of the heads.

The length of recording time for each of the tracks 48 to 56 produced by the five recording heads is controlled by the horizontal synchronizing pulses contained in the video signal. A complete picture frame contains 525 horizontal synchronizing pulses and each of the five parts into which the picture frame is divided is related to an individual group of 105 horizontal pulses contained in the picture frame.

In order to utilize the 525 horizontal pulses for the purpose of dividing the picture frame into five equal parts, the signal passed through gate 16 is fed to the horizontal pulse clipper and differentiator 58. The horizontal pulses passed by the clipper 58 are then counted by an electronic counter 60. The picture frame is divided into five parts by means of the gate selector 62 which provides an output voltage on one of five output circuits every time a pulse arrives from the counter 60. The counter 60 will provide one pulse every time it counts to 105. The first of the five output circuits of gate selector 62 is connected over line 61 to a "coincidence" or "and" gate 64. An output circuit from the single picture gate 16 is also connected to gate 64. The pulse from gate 16 and the pulse from gate selector 62 are combined in gate 64 to provide a pulse which opens gate 36. The second, third, fourth and fifth output circuits of selector 62 are connected over lines 63, 65, 67 and 69 to gates 38, 40, 42 and 44 respectively in consecutive order.

In the normal condition (between recordings of video signals) the gate selector 62 remains in the first stage or number one position, providing a pulse to the "coincidence" gate 64, which gate will not open until it receives a pulse from the single picture gate 16. After the first 105 pulses are counted by counter 60, voltage on line 61 from gate selector 62 will be removed and voltage will be provided on line 63 thereby closing gate 36 and opening gate 38. After the second 105 pulses are counted gate 38 will be closed and gate 40 opened in the same manner. Gates 40, 42 and 44 will be controlled by a pulse provided to the gate selector 62 after each of the third and fourth groups of 105 pulses counted by the counter 60. At the end of the 525th pulse gate 44 will close and the recording will have been completed. At this time gate selector 62 and counter 60 reset themselves for the next recording. The gate selector 62 may be a five-stage ring circuit such as described at pages 122 to 125 of Electronics for March 1948. The counter 60 may be of the vacuum tube type described at page 110 of Electronics for June 1944.

A control track recording-reproducing head 66, which is similar to the heads 10, also receives the initial pulse from gate 16 and records it at the time gate 36 is opened. This control pulse, 88, corresponds to the beginning of the record on track 48 of the first portion of the recorded video signal. As described hereinafter, it is used to determine the point at which reproduction of the recorded signal is to begin.

Figure 2:
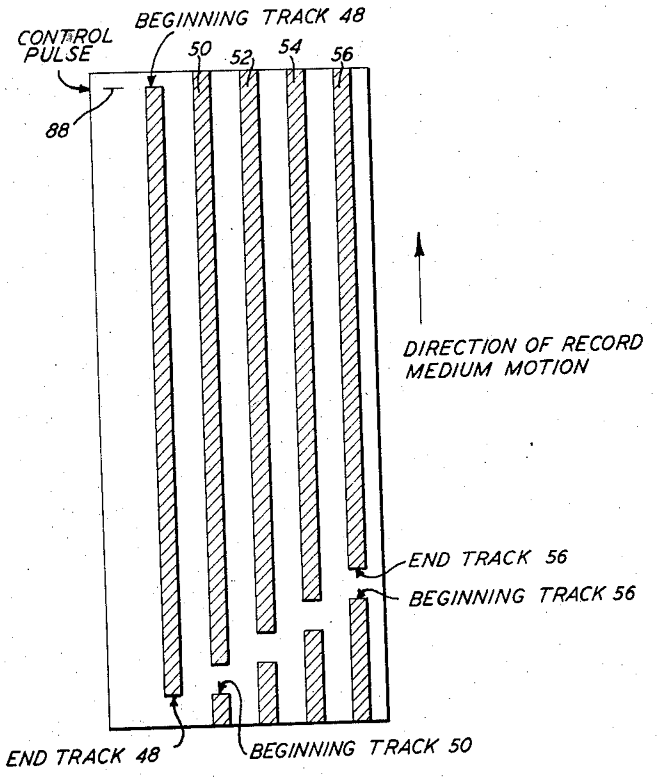
Fig. 2 is a representation of the tracks magnetically recorded on the record medium shown in Fig. 1.

As shown in Fig. 2, a blank space is purposely left in each record track between the beginning and end of the signal to prevent any possible overlapping of signals due to speed variations of the record medium.

In reproducing the recorded signal the single video picture is presented continuously until the recording is no longer needed. Each of the heads 10 (used for reproducing as well as recording) is provided with its own preamplifier 68 which precedes the electronic gates 70 to 78. Gate 70 is opened by a control pulse from the coincidence gate 80 and the first portion of the signal is fed through the equalizer 106 to the television receiver 108, and also to the horizontal pulse clipper 90. Coincidence gate 80, which is similar to gate 64, operates when voltage from the video gate selector 82 and voltage from the multivibrator 84 are combined therein. The multivibrator 84 provides a voltage to the coincidence gate 80 when it is triggered by combining therein a voltage provided from the direct-current source 85 through the control 86, which may be operated manually, and the control pulse 88 recorded on the record medium 9 by head 66.

The length of time each of the gates 70 to 78 remains open is controlled by the number of horizontal synchronizing pulses contained in the portion of the signal passed therethrough. After the 105 horizontal synchronizing pulses contained in the first portion of the signal (recorded on track 48) are passed through the clipper and differentiator 90, they are counted by the electronic counter 92 bridged across the common signal bus 94. After these 105 pulses have been counted, the video gate selector 82 is operated by a pulse from counter 92. The voltage initially on line 96 is removed, closing gate 70, and voltage is applied to line 98 to open gate 72. When gate 72 is opened the second portion of the video picture, recorded on the magnetic record medium, follows the first portion through the equalizer 106 to the television receiver 108. The second portion of the signal is also passed through the clipper and differentiator 90 and the second 105 pulses are counted by counter 92. At the end of the second 105 pulses the gate selector 82 is again operated by a pulse from counter 92. The voltage on line 98 is removed, closing gate 72, and voltage is applied to line 100, opening gate 74. In the same manner the fourth and fifth portions of the recorded signal are passed to the video receiver 108, and through the pulse clipper 90 and the counter 92 to control, by means of the gate selector 82 and lines 102 and 104, the opening and closing of gates 76 and 78.

When gate 78 closes the complete signal, which includes the 525 horizontal synchronizing pulses, will have passed through the conventional television receiver video circuits for display on a cathode-ray tube screen.

The scanning process will be repeated as long as the control button of the control 86 is held down to provide voltage to the multivibrator 84. Voltage provided by the multivibrator 84 to line 110 resets the gate selector 82 to the first stage after gate 78 has closed, and voltage is again provided over line 96 to the coincidence gate 80. Gate 70 will not open until the beginning of track 48 is under its associated reproducing head 10, at which time the control pulse 88 is transmitted to the multivibrator 84.

The present invention has utility as a development and research tool. As a device for storing individual video picture frames it provides a satisfactory means for examining and comparing said frames for signal content in connection with bandwidth reduction studies.

Another application of the present invention would be for teletype or telephoto transmission over narrow band transmission systems. In the latter case, a photograph or printed material to be transmitted would be scanned at slow speed by a television camera and the signal from the scanning tube would modulate a carrier. If the complete scanning of one picture were done in 33.3 seconds, the frequencies contained in the picture signal would cover a band from 0.03 cycle per second to 4000 cycles per second instead of 30 cycles per second to 4 megacycles as in a conventional television picture. The extremely low frequencies are transmitted as modulations on a carrier. It is probable that with single sideband transmission, a bandwidth of only 5 kilocycles would be required for transmitting the modulated carrier. At the receiving terminal the carrier signal would be demodulated and fed to a magnetic recording system similar to that shown in Fig. 1 except that the record medium would rotate at only 8.5 revolutions per minute during recording. This would allow adequate time for recording the full 33.3 seconds of signal in the picture. The low speed drive would then be removed and the record medium driven at 8500 revolutions per minute for normal reproduction of the picture or printed matter on a television receiver screen as described above.

It is to be understood that the above-described arrangements are illustrative of the application of the principles of the invention. Other arrangements may be devised by those skilled in the art without departing from the spirit and scope of the invention.

What is claimed is:

1. In a system for magnetically recording one frame of a video signal comprising a fixed number of vertical and horizontal synchronizing pulses and a fixed number of lines of signal, a rotatable record member provided with a magnetizable peripheral surface, said member having a lineal speed of the magnitude required for recording frequencies of the order of four megacycles, a plurality of electromagnetic transducers disposed transversely to the direction of motion of said record member, a source of video signals, a video signal gate having input and output means, means for connecting said source of signals to said gate input means, means for filtering the vertical synchronizing pulses from a video signal, means for connecting said source of signals to said filtering means, means controlled by the vertical synchronizing pulses provided by said filtering means for opening said video signal gate for only the length of time required to pass a single video picture frame, a plurality of electronic gates having input and output means, the output means of each of said gates being individually connected to one of said transducers, a common line connecting said video signal gate output means and the input means of each of said electronic gates, means for counting the horizontal synchronizing pulses in a video picture frame, means connecting the output means of said video signal gate and said pulse counting means, means controlled by said pulse counting means for consecutively opening each of said electronic gates for a single period of time measured by a predetermined number of said fixed number of horizontal synchronizing pulses to permit a corresponding number of lines of signal in said frame to be recorded in their entirety and in uninterrupted order on said record member by each of said transducers.

2. In a system for magnetically storing and reproducing a single video picture frame comprising a fixed number of vertical and horizontal synchronizing pulses and a fixed number of lines of signal, a rotatable record member provided with a magnetizable peripheral surface, said member having a lineal speed of the magnitude required for recording frequencies of the order of four megacycles, a plurality of electromagnetic transducers disposed transversely to the direction of motion of said record member, a source of video signals, a video signal gate having input and output means, means for transmitting signals from said source to said gate input means, means for filtering the vertical synchronizing pulses from a video signal, means for transmitting signals from said source through said filtering means, means controlled by the vertical synchronizing pulses provided by said filtering means for opening said video signal gate for only the length of time required to pass a single video picture frame, a first group of electronic gates having input and output means, the output means of each of said gates being individually connected to one of said transducers, a common line connecting said video signal gate output means and the input means of each of said electronic gates, a first means for counting the horizontal synchronizing pulses in a video picture frame, means for transmitting the video signal from said video signal gate to said pulse counting means, means controlled by said pulse counting means for consecutively opening each of said electronic gates for a single period of time measured by a predetermined number of said fixed number of horizontal synchronizing pulses to permit a corresponding number of lines of signal in said single video picture frame to be recorded in their entirety and in uninterrupted order on said record member by each of said transducers, means comprising a transducer disposed adjacent said record member and a line connecting the output means of said video signal gate and said transducer for recording a control pulse corresponding to the beginning of the record of the first recorded portion of said video picture frame, means for reproducing said magnetically recorded video picture frame comprising said signal recording transducers and a second group of electronic gates having input, and output means, the input means of each of said gates being individually connected to one of said transducers, a video receiver, a second means for counting horizontal synchronizing pulses, a common line connecting the output means of each of said electronic gates to said video receiver and to said pulse counting means, means responsive to said recorded control pulse for opening the first of said electronic gates at the beginning of the record of the first recorded portion of said video picture frame, means controlled by said second pulse counting means for holding said first gate opened and for consecutively opening each of said remaining electronic gates for a period of time measured by the number of horizontal synchronizing pulses contained in the portion of the video signal passed therethrough.

References Cited in the file of this patent

UNITED STATES PATENTS

| | | |
|---|---|---|
| 2,517,808 | Sziklai | Aug. 8, 1950 |
| 2,657,377 | Gray | Oct. 27, 1953 |
| 2,698,875 | Greenwood | Jan. 4, 1955 |